Oct. 10, 1933.  C. H. WILLIS  1,929,722
ELECTRIC VALVE CONVERTING APPARATUS
Filed Oct. 1, 1931
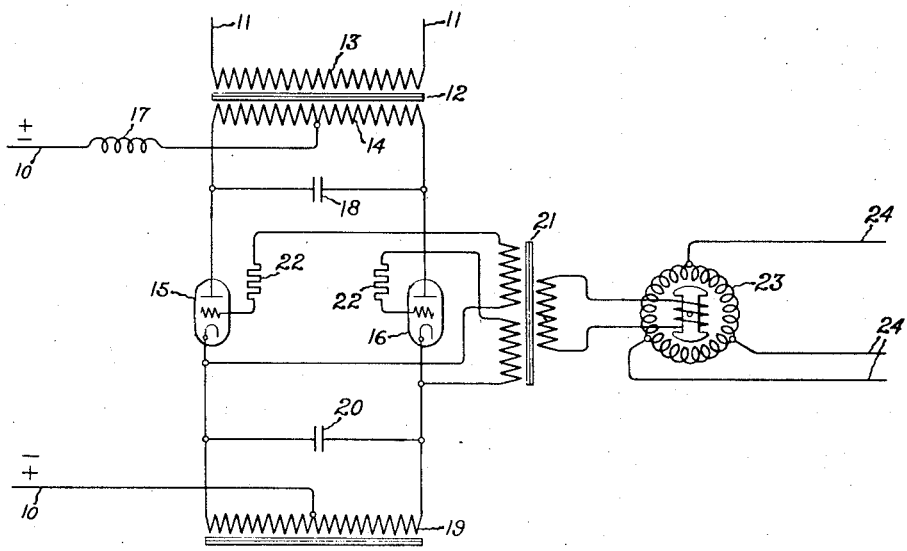
Inventor:
Clodius H. Willis,
by
His Attorney.

UNITED STATES PATENT OFFICE 1,929,722

ELECTRIC VALVE CONVERTING APPARATUS

Clodius H. Willis, Princeton, N. J., assignor to General Electric Company, a corporation of New York Application October 1, 1931. Serial No. 566,368

5 Claims. (Cl. 175—363)

My invention relates to electric valve converting apparatus and more particularly to such apparatus adapted to transmit energy between direct and alternating current circuits.

Heretofore there have been devised numerous electric valve converting apparatus for transmitting energy between direct and alternating current circuits. When operating such apparatus as a rectifier, transmitting energy from an alternating current circuit to a direct current circuit, it has been customary to control the average voltage of the direct current circuit by varying the phase of the grid potentials of the several electric valves. The effect of this type of control is to draw a lagging current from the alternating current circuit, while on the other hand it is usually preferable to draw a leading current in order to improve the power factor of the system. In the majority of the arrangements of the prior art, however, it has not been possible to operate such a controlled rectifier at leading power factors, since this type of operation involves the transfer of the load current from one valve to the next succeeding valve in opposition to the electromotive force of the inductive winding interconnecting the valves. On the other hand, when operating such apparatus as an inverter, transmitting energy from a direct current circuit to an alternating current circuit, it has not been found possible ordinarily to supply lagging loads on the alternating current circuit without the provision of an inordinate amount of commutating capacitance. This is due to the fact that a lagging power factor on the alternating current circuit corresponds to a transfer of the load current between the several electric valves at points in the cycle of alternating potential when the counter-electromotive force of inductive windings connected between the valves opposes such commutation. In my copending applications Serial No. 566,372, and Serial No. 566,373, and in the copending application of C. A. Sabbah, Serial No. 566,377, filed October 1, 1931, all of which are assigned to the same assignee as the present application, there are disclosed and claimed certain electric valve converting apparatus for transmitting energy between direct and alternating current circuits under nonunity power factor conditions on the alternating current circuit. My invention comprises certain modifications and improvements of the arrangements described in the above mentioned copending applications.

It is an object of my invention to provide an improved electric valve converting apparatus for transmitting energy between direct and alternating current circuits under any desired power factor conditions of the alternating current circuit.

It is another object of my invention to provide an improved electric valve converting apparatus for transmitting energy from a direct current supply circuit to an alternating current load circuit and which will supply lagging loads on the alternating current circuit.

It is another object of my invention to provide an improved electric valve converting apparatus which will transmit energy from an alternating current supply circuit to a direct current load circuit, and which will draw leading current from the alternating current circuit.

In accordance with my invention, an electric valve converting apparatus including an inductive winding and a plurality of electric valves interconnecting direct and alternating current circuits, is provided with an impedance means, such as a capacitor, connected in series circuit relationship with the load current of the apparatus, and the impedance is so included in the apparatus that the potential drop across it is available for opposing the electromotive force of the inductive winding interconnecting the circuits for commutating the current between the electric valves under any desired power factor conditions on the alternating current circuit. With such an arrangement, the potential across the impedance means available for commutation, being dependent upon the load current, is in phase with it so that the maximum potential drop of the impedance is available at the desired instants of commutation.

For a better understanding of my invention together with other and further objects thereof, reference is had to the following description taken in connection with the accompanying drawing and its scope will be pointed out in the appended claims. Referring now to the single figure of the accompanying drawing, there is illustrated an arrangement embodying my invention for transmitting energy between a direct current circuit and a single phase alternating current circuit of the type known in the art as a bi-phase half wave electric valve converting apparatus.

Referring now to the drawing I have illustrated an arrangement for transmitting energy between a direct current circuit 10 and an alternating current circuit 11. This apparatus comprises a transformer 12 having a winding 13 connected to the alternating current circuit 11 and a winding 14 provided with an electrical midpoint connected to one side of the direct current circuit 10 and a pair of end terminals connected to the other side of the direct current circuit through electric valves 15 and 16. Electric valves 15 and 16 are each provided with an anode, a cathode, and a control grid and may be of any of the several types well known in the art, although I prefer to use valves of the vapor electric discharge type. A smoothing reactor 17 is preferably connected in the direct current circuit. In case the apparatus is to be used to transmit energy from the direct current circuit to the alternating current circuit, and in case the alternating circuit is not connected to an independent source of electromotive force, a commutating capacitor 18 may be connected between the anodes of the valves 15 and 16 in parallel to the winding 14. In order to produce a component of commutating potential variable in accordance with the phase and magnitude of the load current, there is interposed in the connections between electric valves 15 and 16 and the direct current circuit 10 a reactor or autotransformer 19 provided with an electrical midpoint connected to the direct current circuit and with end terminals connected to the valves 15 and 16, while a commutating capacitor 20 is connected across the winding 19. The grids of electric valves 15 and 16 are adapted to be energized from independent secondary windings of a grid transformer 21 through current limiting resistors 22, while the primary winding of the grid transformer 21 may be energized from any suitable source of alternating control potential variable in phase in order to vary the power factor conditions on the alternating current circuit 11. By way of example I have illustrated a rotary phase shifting transformer 23 energized from a three-phase alternating current circuit 24, although if the alternating current circuit 11 is connected to an independent source of electromotive force, the rotary phase shifting transformer 22 may be energized therefrom through any suitable phase shifting arrangement as will be well understood by those skilled in the art.

Neglecting the commutating winding 19 and capacitor 20, and assuming that the lower direct current terminal is connected directly to the cathodes of the valves 15 and 16, neglecting the commutating capacitor 18, and assuming that the apparatus is operating as a rectifier, it is seen that the above described apparatus comprises simply a bi-phase half wave rectifier. Under these conditions, the average voltage of the direct current circuit 10 may be controlled by retarding the phase of the grid potentials of electric valves 15 and 16 with respect to their anode potentials by means of the rotary phase shifting transformer 22. With this type of voltage control, the rectifying apparatus is the equivalent of a lagging load on the alternating current circuit 11, while it is preferable to draw a leading current from the circuit 11 in order to improve the power factor of the system.

Considering now the action of the commutating winding 19 and capacitor 20 and neglecting the magnetizing admittance of the winding 19, it will be seen that the load current flowing in one half of the winding 19 must be balanced by an equal and opposite current flowing through the other half of the winding, while the only path in which this balancing current can flow is the commutating capacitor 20. That is, the capacitor 20 is effectively in series with a current which is equivalent to the load current of the apparatus and, for the sake of simplicity, may be referred to as being in series relationship with the load current of the apparatus.

For example, assuming that the left hand terminal of the winding 14 is positive so that current flows through electric valve 15, the left hand portion of the winding 19 and the direct current circuit, it will be seen that the load current flows also through the capacitor 20, charging the right hand terminal of this capacitor to a negative potential. If now electric valve 16 be rendered conducting while the left hand terminal of the winding 14 is still positive with respect to the right hand terminal, the capacitor 20 will none the less interrupt the current in the valve 15 and initiate the current in the valve 16, provided only that the potential across capacitor 20 is slightly greater than that of the winding 14 opposing commutation. At the same instant electric valve 15 may be rendered nonconducting and the reactor 17 will force the current through the valve 16 against the electromotive force of the winding 14. In brief, the current may be commutated between the valves 15 and 16 before the electromotive force of the winding 14 reverses polarity, which corresponds to leading power factor conditions on the alternating current circuit 11.

Similarly, when operating the apparatus as an inverter, transmitting energy from the direct current circuit 10 to the alternating current circuit 11, it is normally possible to transfer current from the valve 15 to the valve 16 only when the counter-electromotive force of the right hand portion of the winding 14 is less than that of the left hand portion; that is, when the counter-electromotive force of the winding 14 is in such a direction as to effect commutation. This condition exists only before the electromotive force of the winding 14 reverses polarity, that is, under leading power factor conditions of the alternating current circuit 11. However, as in the case of a rectifier, the series capacitor 20 becomes charged to such a potential that the current may be transferred between the valves 15 and 16 at a point in the cycle when the electromotive force of the winding 14 opposes commutation. Thus, by the proper selection of the capacitor 20, and the control of the rotary phase shifting transformer 23, current may be transmitted between the direct current circuit 10 and the alternating current circuit 11 at any desired power factor on the alternating current circuit 11 from zero to substantially 90 degrees leading or lagging. The addition of the parallel connected capacitor 18 aids in commutating the current between the valves under light load conditions when the commutating potential of the capacitor 20 is small, but in some cases it may be omitted.

While I have illustrated my invention as applied to a half wave valve converting apparatus, it will be obvious to those skilled in the art that it is equally applicable to a full wave converting apparatus, in which case the upper direct current terminal 10 is connected to the outer terminals of the winding 14 through an additional pair of electric valves and commutating winding and capacitor in a manner similar to the connections of the lower direct current terminal.

While I have described what I at present consider the preferred embodiment of my invention, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States is:

1. In combination, a direct current circuit, an alternating current circuit, and apparatus for transmitting energy therebetween under any desired power factor conditions on said alternating current circuit comprising an inductive winding in energy transmitting relation with respect to said alternating current circuit, means including a group of similarly disposed electric valves interconnecting said winding with one side of said direct current circuit, and a connection from the other side of said direct current circuit to said winding, means for controlling the conductivity of said valves, and means for introducing into said apparatus a periodic potential the magnitude of which varies with the load transmitted by the apparatus for commutating the load current between said valves.

2. In combination, a direct current circuit, an alternating current circuit, and apparatus for transmitting energy therebetween under any desired power factor conditions on said alternating current circuit comprising an inductive winding in energy transmitting relation with respect to said alternating current circuit, means including a group of similarly disposed electric valves interconnecting said winding with one side of said direct current circuit, and a connection from the other side of said direct current circuit to said winding, means for controlling the conductivity of said valves, impedance means in series relationship with the load current of said apparatus, and means for utilizing the potential drop of said impedance means for commutating the current between said valves.

3. In combination, a direct current circuit, an alternating current circuit, and apparatus for transmitting energy therebetween under any desired power factor conditions on said alternating current circuit comprising an inductive winding in energy transmitting relation with respect to said alternating current circuit, means including a group of similarly disposed electric valves interconnecting said winding with one side of said direct current circuit, and a connection from the other side of said direct current circuit to said winding, means for controlling the conductivity of said valves, and means including a commutating capacitor in series relationship with the load current of the apparatus and connected between said valves for commutating the current between them.

4. In combination, a direct current circuit, an alternating current circuit, and apparatus for transmitting energy therebetween comprising an inductive winding in energy transmitting relation with respect to said alternating current circuit, means including a group of similarly disposed electric valves interconnecting said winding with one side of said direct current circuit, and a connection from the other side of said direct current circuit to said winding, means for controlling the conductivity of said valves, mutually coupled inductive windings interposed in the connections between said valves and said direct current circuit and a capacitor in series relationship with said inductive windings for commutating the load current between said valves under any desired power factor conditions on said alternating current circuit.

5. In combination, a direct current circuit, an alternating current circuit, and apparatus for transmitting energy therebetween comprising an inductive winding in energy transmitting relation with respect to said alternating current circuit, means including a group of similarly disposed electric valves interconnecting said winding with one side of said direct current circuit, and a connection from the other side of said direct current circuit to said winding, means for controlling the conductivity of said valves, a second inductive winding provided with an electrical midpoint connected to one side of said direct current circuit and with end terminals connected to said electric valves, and a capacitor connected between said end terminals for commutating the load current between said valves under any desired power factor conditions on said alternating current circuit.

CLODIUS H. WILLIS.